Oct. 19, 1954 S. J. SPIRO 2,692,343
PULSE SEPARATING CIRCUIT
Filed May 12, 1953
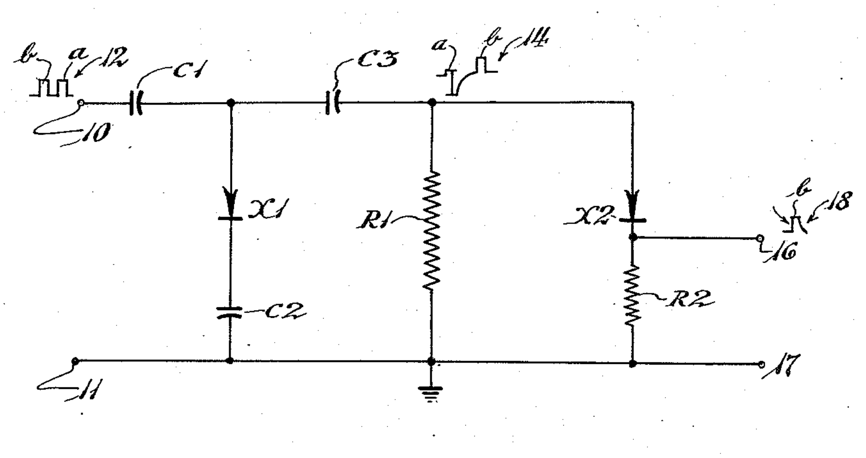
Inventor:
Spero J. Spiro
By Ahlberg, Wupper & Gradolph,
Attorneys.

Patented Oct. 19, 1954 2,692,343

UNITED STATES PATENT OFFICE 2,692,343

PULSE SEPARATING CIRCUIT

Spero J. Spiro, Chicago, Ill., assignor to Stewart-Warner Corporation, Chicago, Ill., a corporation of Virginia Application May 12, 1953, Serial No. 354,580

3 Claims. (Cl. 307—106)

My invention relates generally to signaling and more particularly to means for eliminating the first of a series of pulses in a signal for use in decoding the signal.

In signaling systems using pulse signals, it is frequently desirable to eliminate certain pulses while permitting transmission of others. In the present invention, means are provided to eliminate the first of a series of pulses and to transmit a number of the following pulses without substantial change.

Other objects will appear from the following description, reference being had to the accompanying drawing which is a schematic wiring diagram of the improved circuit.

The circuit comprises input terminal 10 and grounded input terminal 11 receiving pulses as indicated by the wave form 12 comprising two successive pulses *a* and *b*. The train of positive or negative pulses (here assumed to be positive) enters the circuit through an isolating capacitor C1. The first pulse passes through rectifier X1 and charges a capacitor C2 which is connected between the rectifier X1 and ground. The first pulse charges the capacitor C2 to its peak value. This capacitor is large and will retain its charge an interval of time, depending upon the resistance to reverse flow of current in the rectifier and the value of the capacitor C2. It will retain 63% of its charge for a length of time, $t$ in seconds, in accordance with the formula $t=RC$, where R is the back resistance of the rectifier plus the resistance of R1, in ohms and C is the capacity of capacitor C2 in farads. The discharge path of the capacitor C2 comprises the rectifier X1, capacitor C3 (because of its leakage resistance) and resistance R1.

If the train of pulses continues for a time, not longer than the time constant $t$ of the mesh comprising capacitor C2, rectifier X1, capacitor C3, and resistor R1, the second and succeeding pulses will pass through a capacitor C3, which together with R1, constitutes a differentiating network to restore the DC level of the pulse, causing the second pulse *b* to assume the position shown in the wave form 14. This pulse signal then passes into a clipper circuit, comprised by a rectifier X2 and resistor R2, to eliminate the undesired negative (or positive) component of the pulse. Thus the first pulse is eliminated and the second and following pulses appear across resistor R2 at output terminals 16 and 17 as the pulse *b* having the wave shape as shown at 18.

In general, for eliminating or suppressing the first pulse of a train of pulses of 500 pairs of pulses per second, the pulses being separated by three microseconds, the forward resistance of rectifier X1 should be of relatively low impedance, such as 50 to 500 ohms, and the value of the capacitor C2 chosen so that the time constant of the C2—X1—C3—R1 mesh, computed as indicated above, is greater than the interval between the pulses of a pair. Capacitor C3 and R1 form a differentiating network. The resistor R2 is of sufficiently high value to clip the negative portion of the signal in the form indicated at 14, and to produce the unipolar pulse shown at 18.

It will be understood that if the input pulses are negative instead of positive, as herein previously assumed, the rectifiers X1 and X2 should be connected in their circuits in the reverse direction.

This circuit provides a novel means for eliminating or suppressing the first pulse of a train of pulses, by having the first pulse develop a voltage across a capacitor, which voltage prevents the rectification of following pulses in the group until the voltage across the capacitor has again returned to a low value.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A pulse separating circuit for eliminating from a train of pulses the first pulse of a group comprising, input terminals and output terminals, one of each pair of terminals being grounded, a first rectifier, an isolating capacitor connected between the ungrounded input terminal and the rectifier, a relatively large storing capacitor connected between the grounded input terminal and the rectifier, a differentiating network compriisng a series capacitor and a shunt resistor connected between said isolating capacitor and the grounded terminals, a second rectifier and a second resistor connected in series across the resistor of the differentiating network, and output terminals connected to the ends of the second resistor.

2. A pulse separating circuit for eliminating from a train of pulses the first pulse of a group comprising, a capacitor having a capacity such that it will be substantially fully charged by one of the pulses of the train, a rectifier connected to the capacitor to supply unidirectional input pulses to charge the capacitor, the back-resistance of the rectifier being sufficient to permit the charge to remain on the capacitor for an interval of time at least as great as the time separation of successive pulses, a differentiating mesh connected across the rectifier and capacitor, and a clipper circuit comprising a rectifier and resistor in series connected to the differentiating mesh.

3. A pulse separator circuit for eliminating from a train of pulses the first pulse of a group comprising, a pair of input terminals and a pair of output terminals, one terminal of each pair being grounded, a relatively large storing capacitor and a rectifier in series connected between the input terminals, a differentiating network comprising a series capacitor and a shunt resistor connected between the input terminals, and a clipper circuit comprising a rectifier and a resistance connected in series across the resistance of the differentiating network.

No references cited.